(12) United States Patent
Bratkovski et al.

(10) Patent No.: US 8,983,238 B2
(45) Date of Patent: Mar. 17, 2015

(54) OPTICAL RESONATOR TUNING USING PIEZOELECTRIC ACTUATION

(75) Inventors: Alexandre Bratkovski, Mountain View, CA (US); Sagi Mathai, Palo Alto, CA (US); Duncan Stewart, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1022 days.

(21) Appl. No.: 12/260,016

(22) Filed: Oct. 28, 2008

(65) Prior Publication Data
US 2009/0245714 A1  Oct. 1, 2009

Related U.S. Application Data

(60) Provisional application No. 61/040,060, filed on Mar. 27, 2008.

(51) Int. Cl.
G02F 1/035 (2006.01)
G02B 6/10 (2006.01)
G02B 6/12 (2006.01)

(52) U.S. Cl.
CPC .................................. *G02B 6/12007* (2013.01)
USPC ................. 385/2; 385/131; 385/132

(58) Field of Classification Search
USPC .......................................... 385/1–3, 129–132
See application file for complete search history.

(56) References Cited

U.S. PATENT DOCUMENTS

| | | | | |
|---|---|---|---|---|
| 4,829,532 A | * | 5/1989 | Kane | 372/20 |
| 5,313,535 A | * | 5/1994 | Williams | 385/14 |
| 5,502,781 A | * | 3/1996 | Li et al. | 385/4 |
| 6,453,086 B1 | * | 9/2002 | Tarazona | 385/20 |
| 6,751,368 B2 | * | 6/2004 | Lim et al. | 385/14 |
| 6,925,226 B2 | | 8/2005 | Lim et al. | |
| 7,110,628 B2 | * | 9/2006 | Wong et al. | 385/14 |
| 2003/0138178 A1 | * | 7/2003 | Kimerling et al. | 385/2 |
| 2004/0008942 A1 | * | 1/2004 | Scheuer et al. | 385/39 |
| 2004/0042699 A1 | * | 3/2004 | Chen et al. | 385/1 |
| 2004/0114867 A1 | * | 6/2004 | Nielsen et al. | 385/40 |
| 2004/0120638 A1 | * | 6/2004 | Frick | 385/27 |
| 2005/0286602 A1 | * | 12/2005 | Gunn et al. | 372/94 |

FOREIGN PATENT DOCUMENTS

WO   WO 2009/073403 A1 * 6/2009 ............. G02B 6/132

OTHER PUBLICATIONS

"Micrometre-scale silicon electro-optic modulator," by Xu et al, Nature, vol. 435, May 2005, pp. 325-327.*

* cited by examiner

*Primary Examiner* — Ryan Lepisto
*Assistant Examiner* — Robert Tavlykaev

(57) ABSTRACT

An optical resonator configured to be tuned using piezoelectric actuation, includes a core, the core being configured to transmit light; a piezoelectric layer; a first electrode and a second electrode. The piezoelectric layer is interposed between the first electrode and the second electrode. A voltage difference across the first and second electrodes alters a geometric dimension of the piezoelectric layer such that physical force is applied to the core and a resonant optical frequency of the resonator is changed. A method of utilizing mechanical stress to tune an optical resonator includes applying physical force to the resonator by subjecting a piezoelectric material to an electric field, the physical force changing a resonant frequency of the resonator.

18 Claims, 7 Drawing Sheets

OPTICAL RESONATOR TUNING USING PIEZOELECTRIC ACTUATION

CROSS-REFERENCE TO RELATED APPLICATION

The present application claims priority from provisional application Ser. No. 61/040,060, filed Mar. 27, 2008, the contents of which are incorporated herein by reference in their entirety.

BACKGROUND

Light beams or optical signals are frequently used to transmit digital data. For example, optical signals are used in fiber optic systems for long-distance telephony and internet communication. Additionally, optical signals are frequently used to transmit data between electronic components on a single circuit board or between electronic components on adjacent or nearby circuit boards.

Consequently, optical technology plays a significant role in modern telecommunications and data communication. Examples of optical components used in such systems include optical or light sources such as light emitting diodes and lasers; waveguides; fiber optics; lenses and other optics; photo-detectors and other optical sensors; optically-sensitive semiconductors; optical modulators, and others.

Such systems making use of optical components often rely upon the precise manipulation of optical energy, usually in the form of a light beam, to accomplish a desired task, such as data communication. This is especially true in systems utilizing light for high-speed, low-energy communication between two nodes.

Often, optical resonators are used to selectively filter, switch, or modulate light beams. Ring resonators are a type of optical resonator. Ring resonators typically have an optical waveguide in a closed loop coupled to a tangential waveguide. When light of the appropriate wavelength is coupled to the loop by the tangential waveguide, the ring resonator can serve as a modulator or detector. The amount of energy coupled into the ring resonator depends on a variety of factors including the characteristic resonant optical frequency of the ring.

In some cases, it can be desirable to tune the resonant optical frequency of an optical resonator to counteract instabilities within the system or to allow the resonator to act on a different frequency of optical energy within the tangential waveguide.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
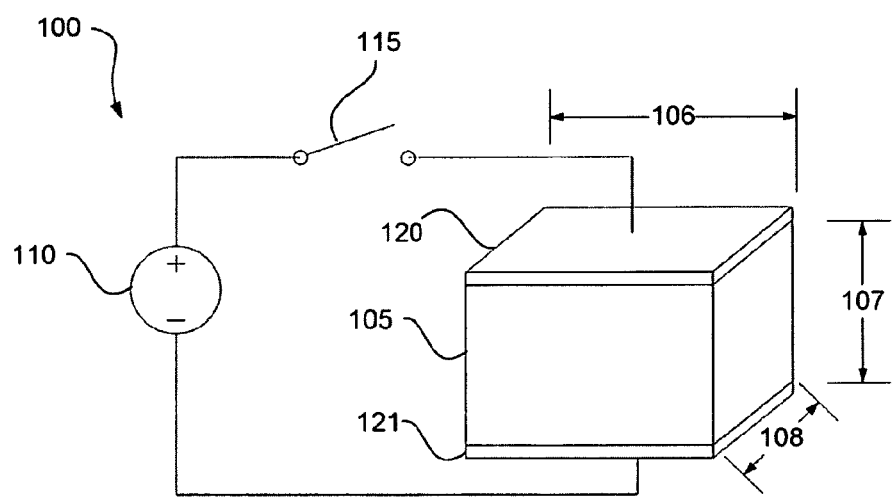
FIG. 1 is a diagram showing one illustrative configuration for applying an electric field to piezoelectric materials, according to principles described herein.

As described above, optical resonators, such as ring resonators, may be used in many different optical devices. Ring resonators typically comprise an optical waveguide formed in a circular or elliptical annulus. The ring resonator is optically coupled to a tangential waveguide. In some cases, it can be desirable for the optical resonant frequency of the ring resonator to substantially match the optical frequency of a portion of energy passing through the tangential waveguide. For example, in wavelength division multiplexing, the optical energy transmitted through the tangential waveguide can be made up of optical energy divided among a plurality of different wavelength bands or "lines". Each line may be narrow, on the order of 1 MHz to 1 GHz in width. Each different line can serve as a carrier signal for a separate data signal.

Ring resonators that are optically coupled to the tangential waveguide can be tuned to specific lines for modulation, detection, and de-multiplexing operations. The resonant frequency of a ring resonator is dependant on factors including the material of which it is made, the geometry of the resonator, and its temperature. Changes in the operating environment can cause the resonant frequency of a ring resonator to undesirably shift away from the line frequency that the ring resonator is paired with. Additionally, it can be desirable to shift the optical resonant frequency of a ring resonator from one line to another. By actively controlling one or more factors that affect the ring's optical resonant frequency, the ring can be "tuned" to keep its optical frequency aligned with a given line or switch from one line to another.

In one method of tuning a resonator, the temperature of the resonator is varied to change the resonant or absorptive frequency of the ring resonator. This is typically done by inclusion of some sort of heating element that is controlled to obtain the desired temperature and therefore the desired resonant frequency of the ring resonator. However, because of the inclusion of heating elements, a greater amount of power and heat dissipation can be required. Further, in high density applications, thermal cross talk between ring resonators can become a significant issue. In applications where lower heat dissipation and high component densities are desired, alternative methods of tuning the ring resonators can be used.

Another technique for tuning a resonator includes a level of electric current run through the modulator ring. This current can be controlled through integrated electrodes, for instance, p-type and n-type doped silicon electrodes. By varying the current, the resonant or absorptive frequency of the ring resonator can be varied.

Still another technique for tuning a resonator includes controlling the physical dimensions of the resonator through mechanical stress. Accordingly, the current specification describes the use of piezoelectric or piezoelectric materials to control the resonator geometry and, therefore, its resonant frequency via the application of mechanical stress. Piezoelectric or piezo active materials are crystalline materials whose shape can be altered by application of an electric field across the material. Some examples of piezoelectric materials are quartz and silicon. The speed of shape change in response to a voltage may be very fast for example, within a few nanoseconds, exceeding that of thermal tuning. Additionally, there is generally very little current leakage through the piezoelectric material, leading to low losses in electrical power.

Ring resonators can be made from a variety of materials, including materials that exhibit the piezoelectric effect, such as silicon. In one exemplary embodiment the adjustment of the cross-section of a silicon ring resonator by application of a voltage across the ring accomplishes the desired tuning effect. Another embodiment describes the inclusion of a piston made of a piezoelectric material, such as silicon, in the ring resonator package to adjust the cross-section of the resonator. Linear deformations of the cross-section smaller than 0.01% may be enough to shift the resonant frequency. This magnitude of deformation may be accomplished using the piezoelectric properties of a variety of materials, such as silicon.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

As used in the present specification and in the appended claims, the term "optical energy" refers to radiated energy having a wavelength generally between 10 nanometers and 500 microns. Optical energy as thus defined includes, but is not limited to, ultraviolet, visible, and infrared light. A beam of optical energy may be referred to herein as a "light beam" or "optical beam." The resonators described herein may vary resonant frequency over a range of, for example, 850-1600 nm.

As used in the present specification and in the appended claims, the term "optical source" refers to a device from which optical energy originates. Examples of optical sources as thus defined include, but are not limited to, light emitting diodes, lasers, light bulbs, and lamps.

The principles disclosed herein will now be discussed with respect to illustrative systems and methods.

Illustrative Systems

Referring now to FIG. 1, an illustration of a circuit (100) is shown to demonstrate illustrative piezoelectric material qualities. A crystal (105) which may be made of any material that exhibits piezoelectric properties is shown in series with a voltage source (110) and a switch (115) in open position.

The crystal (105) is sandwiched between two plates (120, 121). The two plates (120, 121), are made of a conductive material and are used to create an electric field across the crystal (105). Because the switch (115) is open, there is no applied voltage bias to the plates (120, 121) and therefore no electric field across the crystal (105). The crystal's dimensions (106, 107, 108) are the dimensions of the crystal (105) in its natural or unaltered state. As will be apparent to one skilled in the art, the actual shape and geometry of the crystal can vary greatly as best suits a particular application.

Figure 2:
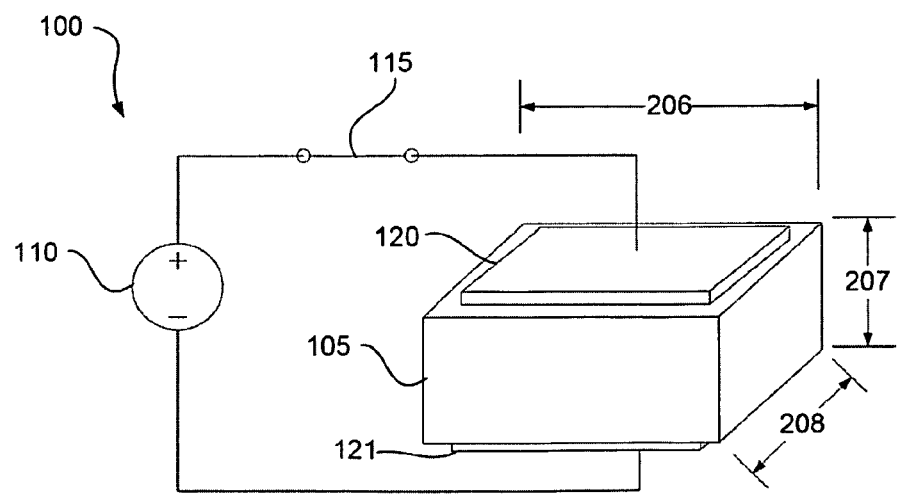
FIG. 2 is a diagram illustrating the response of piezoelectric materials to an applied electric field, according to principles described herein.

FIG. 2 represents the same circuit (100) and crystal (105) except that the switch (115) is in its closed position. Because the switch (115) position is closed, the voltage source (110) is able to apply a voltage difference to the plates (120, 121) creating an electric field across the crystal (105). The piezoelectric properties of the crystal (105), along with the applied voltage bias from the voltage source (110), results in a change in the physical geometry of the crystal (105). The physical change of the crystal is apparent in the new dimensions (206, 207, 208) of the crystal (105).

The changes between the dimensions (106, 107, 108) of the crystal (105) in FIG. 1 and the dimensions (206, 207, 208) of the crystal (105) in FIG. 2 are greatly exaggerated for illustrative purposes. The actual changes in the dimensions of a piezoelectric crystal in response to an applied voltage or electric field are usually much less dramatic and partly dependent on the material of which the crystal is made, the unbiased or natural geometry of the crystal, and the magnitude and distribution of the electric field applied across the crystal.

Figure 3:
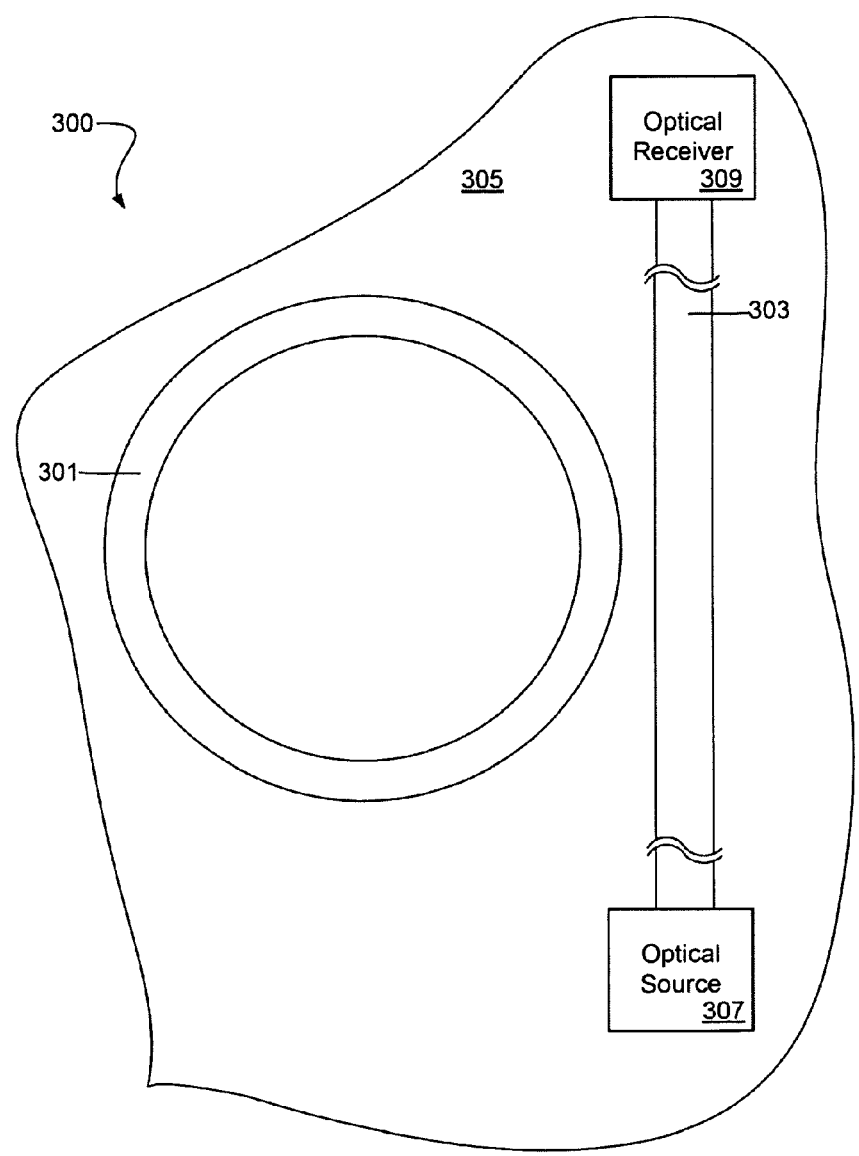
FIG. 3 is a diagram of an illustrative ring resonator and tangential waveguide, according to principles described herein.

Referring now to FIG. 3, a diagram of one embodiment of an optical modulator (300) is shown. The illustrative optical modulator (300) has a first optical waveguide or "ring resonator" (301) arranged in a loop. A second optical waveguide (303) is tangentially arranged with respect to the first optical waveguide (301) and is optically coupled to the first optical waveguide (301). In other words, the second optical waveguide (303) is arranged tangentially with respect to the loop of the ring resonator (301). The ring resonator (301) and second optical waveguide (303) are in optical communication with each other at the tangential point on the ring resonator (301).

The optical waveguides (301, 303) may be fabricated out of semiconductor materials, such as silicon, gallium arsenide, germanium, or other suitable materials that are at least semitransparent in the desired wavelength region. Other materials, such as metals, may also be included in the optical modulator as electrical conductors or for other uses. The optical waveguides (301, 303) are configured to conduct optical energy, and are fabricated on a substrate (305), such as a silicon substrate. In some embodiments, an insulating layer such as silicon dioxide may be deposited on the substrate (305) to encapsulate the optical waveguides (301, 303).

The ring resonator (301) has a resonant frequency which, as mentioned above, is at least partially determined by its cross-sectional dimensions and operating temperature. The ring resonator (301) is configured to sustain optical energy having a wavelength corresponding to the resonant frequency or a range of wavelengths centered on the resonant frequency of the resonator (301). Other optical energy of any different wavelength is attenuated or suppressed within the ring resonator (301) by destructive interference.

Optical energy is generated by an optical source (307), such as a laser or a light emitting diode (LED), and enters the modulator (300) through a first end of the second optical waveguide (303). The optical energy is then transmitted through the optical coupling between the second waveguide (303) and the ring resonator (301) into the ring resonator (301). As noted above, optical energy having the correct wavelength (i.e. at or near the resonant frequency of the ring resonator) will be sustained by the resonator (301), while optical energy at other wavelengths will be suppressed by destructive interference.

A wavelength that is being used to transmit data between the optical source (307) and the optical receiver (309) may be referred to as the carrier wavelength. The carrier wavelength may or may not correspond to the resonant frequency of the ring (301) depending on how the modulator (300) is configured to perform.

For example, the ring resonator (301) may act as a modulator of the carrier wavelength by selectively varying the amount of coupling between the ring resonator (301) and the tangential waveguide (303) or the amount of absorption of the carrier wavelength within the ring resonator (301) by detuning the resonant frequency of the ring (301) away from the carrier wavelength. The modulated optical energy may then be transmitted through the remainder of the second optical waveguide (303) to the optical receiver (309) disposed at a second end of the second optical waveguide (303). The receiver (309) may be, for example, a photodetector or another waveguide.

As noted herein, the resonant frequency of the ring resonator (301) may be tuned by altering its cross-section dimensions. The resonant frequency may be shifted enough to cause optical energy that was previously coupled into the ring resonator (301) to pass through the second waveguide undisturbed. Additionally, this shift in resonant frequency may cause the ring resonator (301) to shift from one optical line to another.

According to the current specification, the altering of the cross-section would be achieved through the creation of an electric field across a ring resonator (301), if the ring (301) is itself made of piezoelectric material. Alternatively, an electrical field could be applied across a separate piezoelectric element that would compress or stretch the dimensions of the ring resonator (301). These electric fields would be created via the application of a voltage difference to conductors placed around the piezoelectric element as illustrated in FIG. 1 and FIG. 2. Both embodiments require a voltage source either included with the modulator (300) or supplied by an external source. Further detail regarding the creation of the electric field will be discussed in relation to the next figure.

Figure 4:
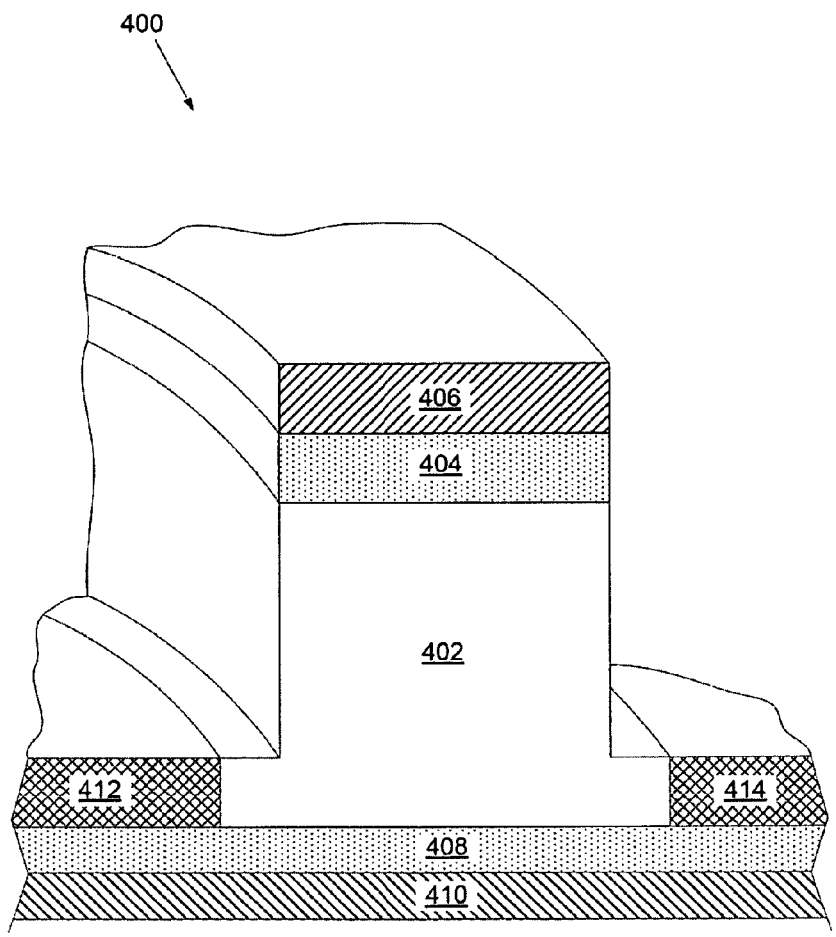
FIG. 4 is a cross-sectional view of an illustrative ring resonator, according to the principles described herein.

Referring now to FIG. 4, a cross-sectional perspective view of one illustrative embodiment of a ring resonator (400) is shown. The cross-sectional layers include the core (402) of the ring waveguide, a left bordering layer (412) and a right bordering layer (414), upper and lower dielectric layers (404, 408), and upper and lower conductive layers (406, 410). According to one exemplary embodiment, the cross-sectional area and dimensions of the waveguide (400) will be substantially uniform around the entire annulus, with the possible exception of locations where electrical connections between a voltage source and the conductive layers (406, 410) are made.

The core (402) is the portion of the waveguide in which all or a substantial portion of the optical beam, also referred to as the majority guided mode, is propagated. According to one exemplary embodiment, the core (402) is made of intrinsic silicon, meaning that the material in the core is made of silicon that has not been intentionally doped. The core (402) may alternatively be made of another material that also exhibits piezoelectric qualities. Silicon has particular advantages because, in addition to exhibiting piezoelectric properties, it has familiarity of use and availability exceeding that of many other potential materials.

As shown in FIG. 4, an upper dielectric layer (404) and a lower dielectric layer (408) are disposed, respectively, between the conductive layers (406, 410) and the core (402). These dielectric layers (404, 408) function to space the conductive layers (406, 410) far enough away from the core (402) so as to preserve the evanescent field needed to couple the waveguide with a neighboring ring or waveguide (e.g. coupling the ring resonator (301) with the second optical waveguide (303) of FIG. 3). The upper and lower dielectric layers (404, 408) are made of an electrically insulating material with an index of refraction less than that of intrinsic silicon to help confine the guided light to the core (402). An example of material that may be used to meet these requirements is silicon dioxide ($SiO_2$).

The left bordering layer (412) and the right bordering layer (414) next to the core (402) may be made of a dielectric material that is the same, similar or different than the material of the upper and lower dielectric layers (404, 408). The left bordering layer (412) and the right bordering layer (414) may also be made of a conducting material, such as doped silicon. Because the left and right bordering layers (412, 414) abut only a small portion of the core's (402) surface area, the conducting material that makes up the bordering layers (412, 414) may have minimal impact on the optical scattering, guiding, and coupling properties of the core (402).

These layers (412, 414) may be used to introduce or control carriers within the core (402), thereby changing the effective refractive index of the ring resonator (301; FIG. 3) at high speeds. By altering the refractive index at high speeds, the ring resonator (301; FIG. 3) can be used to modulate the coupled carrier optical frequency within the second waveguide (303, FIG. 3).

The upper conductive layer (406) and the lower conductive layer (410) are made of metal or any other conductive material, such as highly doped silicon ($n^{++}$ or $p^{++}$ silicon). The conductive layers (406, 410) are situated so that the core (402) lies between them.

An electric field may be created across the core by the application of a voltage differential across the upper conductive layer (406) and the lower conductive layer (410). For example, the upper conductive layer (406) may be connected to a voltage that is higher in reference to a voltage applied to the lower conductive layer (410). The application of this voltage differential will result in an electric field between the upper and lower conductive layers (406, 410) and therefore across the piezoelectric core (402). The electric field may then result in the changing of the cross-sectional dimensions of the piezoelectric core (402), leading to a change in the resonant frequency. If the change in dimensions is great enough, this may result in the cut-off of the previously guided frequency of light, and the guiding of a previously cut-off frequency.

The change in the cross-sectional dimensions of the core (402) and therefore the change in guided frequencies of light in the core (402) is at least partially dependent on the piezoelectric properties of the material used in the core (402), the core's geometry, and the magnitude of the electric field applied to the core (402). The electric field applied to the core is at least partially dependent on the magnitude of the voltage difference applied to the conductive layers (406, 410), the geometry of the conductive layers (406, 410), their placement in relation to the core (402), and the materials, in addition to the core (402), between the conductive layers (406, 410).

In order to maximize the effect of the applied voltage, i.e., create as strong an electric field as possible that is as uniform as possible across the core (402), the placement and geometry of the conductive layers (406, 410) may need consideration. For example, if the upper conductive layer (406) is much less wide horizontally than the core (402), the electric field may be focused on only a portion of the core (402). If the upper conductive layer (406) were much wider horizontally than the core (402), then the electric field would be spread out over areas other than the core (402) resulting in a weaker electric field in the core (402) itself. Additionally, if the conductive layers (406, 410) are spread too far vertically away from the core (402), this would also spread the electric field over areas other than the core. However, placing the conductive layers (406, 410) too close to the core (402) could undesirably alter the shape of the guided mode and/or introduce undesirable optical losses due to absorption and scattering.

Figure 5:
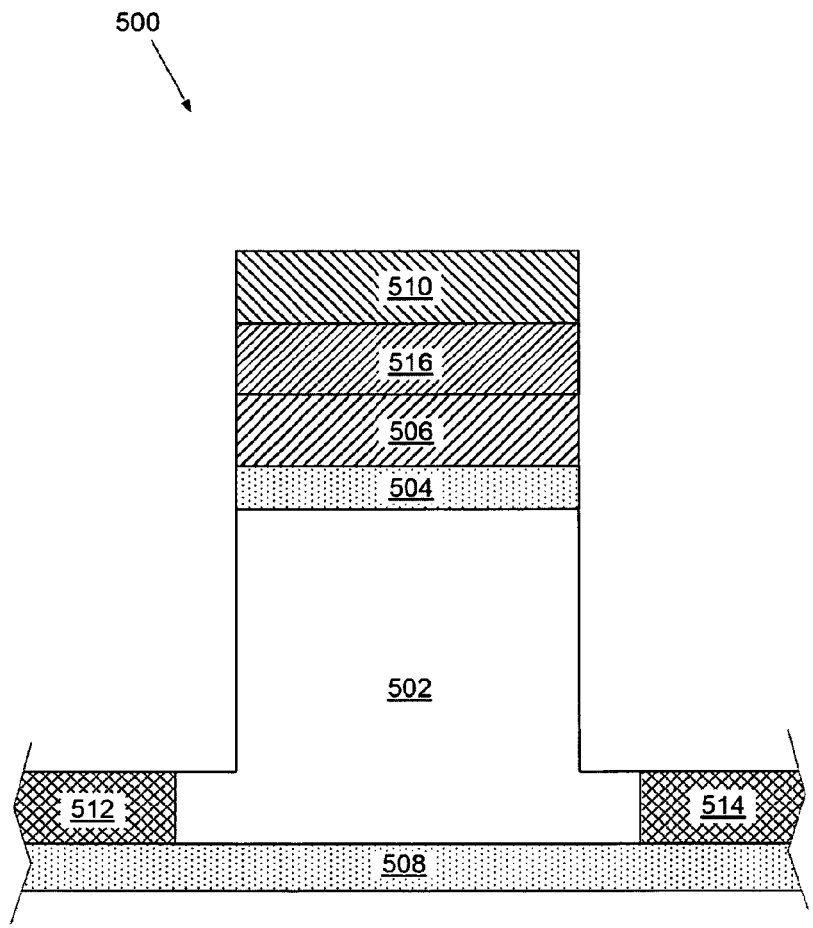
FIG. 5 is a cross-sectional view of an illustrative ring resonator, according to the principles described herein.

FIG. 5 is a cross-sectional view of an illustrative ring resonator (500). This embodiment is similar to that shown in FIG. 4 in that it includes a core layer (502), left and right bordering layers (512, 514), an upper dielectric layer (504), and a lower dielectric layer (508). However, instead of using the core (502) as a piezoelectric layer, a separate piezo element (516) is placed above the core (502). Conducting layers (506, 510) are placed above and beneath the separate piezo element (516). The separate piezo element (516) can be any one of a variety of piezoelectric materials including ferroelectric materials, lead zirconate titanate, lithium based materials, polyvinylidene fluoride (PVDF), silicon, or any other suitable piezoelectric material.

The separate piezo layer (516) sandwiched between two conductive layers (506, 510) creates a "piston" which changes dimensions when a voltage is applied across the adjacent conductive layers (506, 510). The mechanical force of this change in dimensions deforms the core (502), altering the core (502) dimensions and leading to a change in the resonant frequency of the ring (500), similar to that discussed in relation to FIG. 4.

In one Illustrative embodiment, the top of the piston (506, 510, 516) can be constrained such that the vertical contraction or expansion of the piston (506, 510, 516) exerts a vertical mechanical force on the underlying core (502). By way of example and not limitation, the piston (506, 510, 516) could be constrained by placing a layer above the piston or by using the ring resonator in a buried waveguide configuration.

In another embodiment, the expansion or contraction of the piezoelectric element (516) in a horizontal direction transmits mechanical forces into the core (502), without the need for additional restraint. The horizontal motion of the piezo layer can be estimated using Poisson's ratio, which is a measure of the tendency of a material to exhibit changes in transverse strain when an axial strain is applied.

With the embodiment shown in this cross-section (500), the core (502) may be made of some material that does not exhibit piezoelectric properties. This is because the piston (506, 510, 516) acts to produce the physical force used to change the dimensions of the core (502) rather than this force being produced by the core (502) itself, as in FIG. 4.

A variety of geometric variables associated with the layers that make up the ring resonator can be altered to optimize the performance of the ring resonator for a desired application. By way of example and not limitation, the placement of the piston (516, 510, 506) in relation to the core (502) can be adjusted to alter the performance of the ring resonator (500). For example, a thicker upper dielectric layer provides greater optical isolation between the lower conductive layer (506) and the core (502).

Additionally, the thickness of the upper dielectric layer (504) can be varied to shape the optical mode within the ring resonator. However, the placement of the piston (516, 510, 506) too far away from the core (502) may result in a lessened ability of the piston (516, 510, 506) to apply mechanical stress to the core (502) and therefore change the resonant frequencies supported in the waveguide.

Further, the size and thickness of the piezo layer (516) can also be varied. A thicker piezo layer (516) may result in a greater overall dimensional change, but may lessen the voltage gradient needed through the piezo layer (516).

Figure 6:
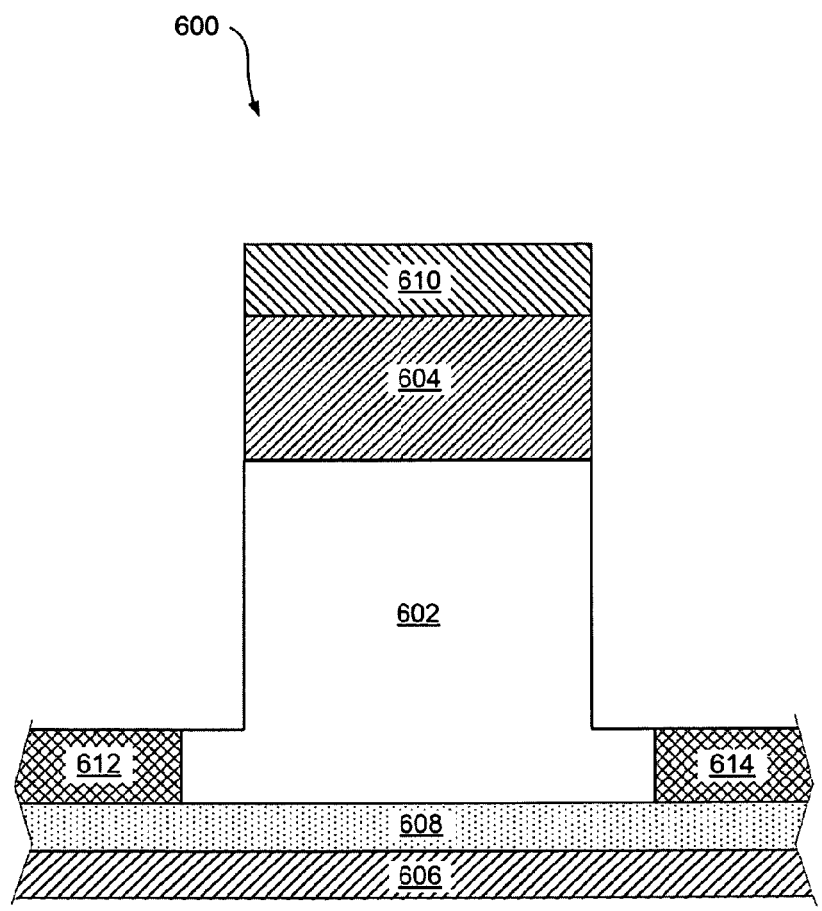
FIG. 6 is a cross-sectional view of an illustrative ring resonator, according to the principles described herein.

FIG. 6 is a cross-sectional view of an illustrative ring resonator (600). This embodiment is similar to that shown in FIG. 4 in that it includes a core (602), upper and lower conductive layers (610, 606), and layers (604, 608, 612, 614) of material surrounding the core (602). In this embodiment, the core (602) is made of a material that can be used to guide light and also exhibits piezoelectric properties. However in this embodiment, a high-κ dielectric material (604) is placed between the core (602) and the upper conductive layer (610).

The term "high-κ dielectric" refers to a material with a high dielectric constant as compared to silicon dioxide. Examples of high-κ dielectric material include, but are not limited to, hafnium and zirconium oxides. The high-κ dielectric material has lower current leakage characteristics than silicon dioxide because one can use larger physical thickness. Indeed, the high-κ dielectric can be thicker without significant reduction in the electrical field, producing greater optical isolation between the captured optical mode propagating in the core (602) and the upper conductor (610).

Figure 7:
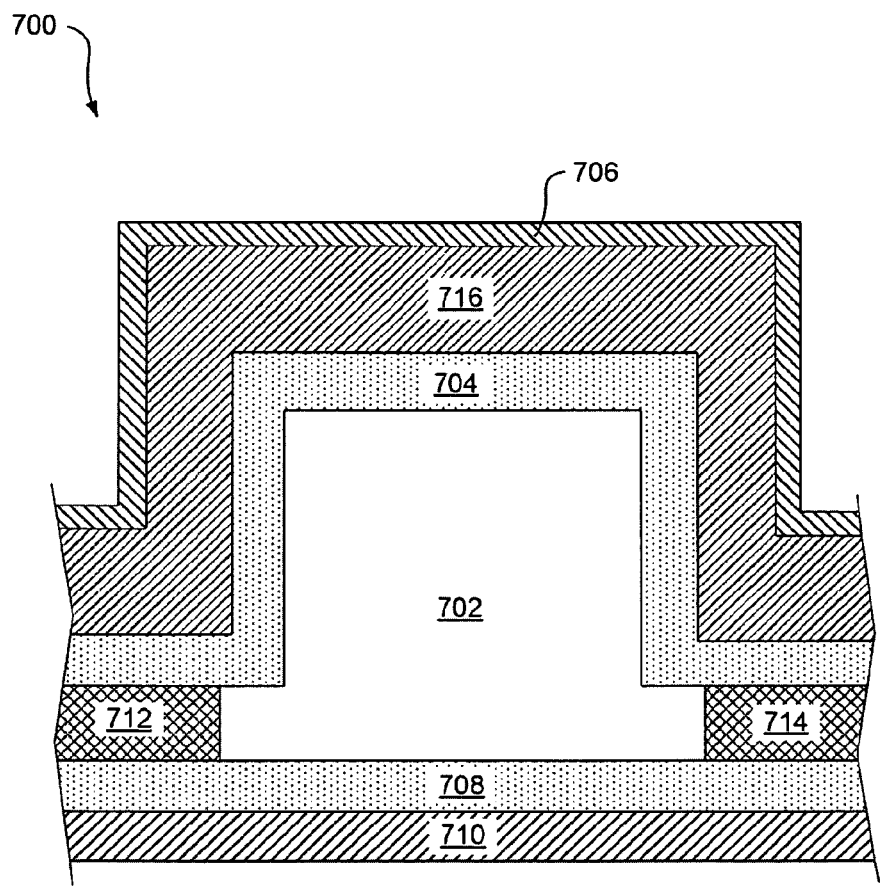
FIG. 7 is a cross-sectional view of an illustrative ring resonator, according to the principles described herein.

FIG. 7 is a cross-sectional view of an illustrative ring resonator (700) that is also configured to be tuned using the piezoelectric effect. Again, this embodiment contains similar layers as that displayed in previous embodiments. The core (702) is not necessarily made of a piezoelectric material.

The upper surface of the core (702) is covered by an upper dielectric layer (704). Below the core (702), a lower dielectric layer (708) is disposed. These dielectric layers (704, 708) protect and electrically insulate the core (702) and help shape the captured optical mode. According to one exemplary embodiment, the dielectric layers (704, 708) could be made of silicon dioxide ($SiO_2$).

Bordering the upper dielectric layer (704), a layer of piezoelectric material (716) is applied. According to one exemplary embodiment, the piezoelectric layer (716) can be un-doped, highly resistive silicon. An upper conductive layer (706) borders the upper piezoelectric layer (716) above and a lower conductive layer (710) borders the lower dielectric layer (708) below.

As in other embodiments, an electrical field could be applied across the piezoelectric layer (716) via a voltage difference applied across the upper conductive layer (706) and the lower conductive layer (710). If the left bordering layer (712) or right bordering layer (714) is made of a conducting material such as metal or doped silicon, the bias voltage may also be applied via the upper conductive layer (706) and the left bordering layer (712) or the right bordering layer (714). This application of the electric field may once again cause changes in the dimensions of the piezoelectric layer (716). Because of mechanical stress, the change in the dimensions of the piezoelectric layer will apply mechanical stress to the core (702) and may result in a shift of the resonant frequency of the resonator (700).

Although this embodiment contains similar layers to those discussed in relation to other embodiments, the geometry of the layers above the core (702) is significantly different. In this cross-section of a ring resonator (700), the piezoelectric layer (716) and upper conducting layer (706) extend much wider than, and approximately follow the outline of, the core (702). Because of this change in geometry, it will be possible to apply greater stress to the core, and therefore create a greater change in the resonant frequency.

In this embodiment, special consideration is given to the tangential gap through which optical energy is coupled into the ring (700) from a second waveguide (e.g., 303, FIG. 3). The improper imposition of materials into the tangential gap can prevent optimal optical coupling between the ring resonator (700) and a second waveguide (303).

Figure 8:
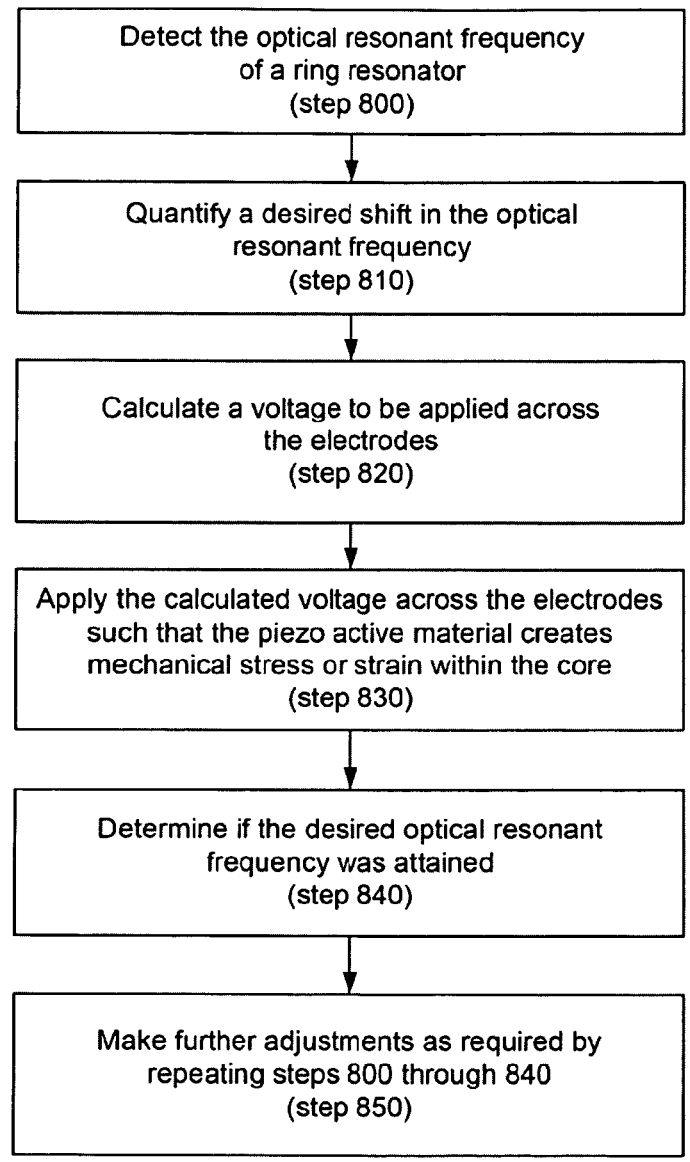
FIG. 8 is a flowchart showing one illustrative method of utilizing mechanical stress to tune a ring resonator, according to principles described herein.

FIG. 8 is a flowchart showing one illustrative method of utilizing mechanical stress to tune a ring resonator. In a first step, the current optical resonant frequency of the ring resonator may be determined (step 800). This determination may be made in a variety of ways including comparing the magnitude of the signal contained within the optical resonator to the available magnitude of a given frequency within the tangential waveguide.

Next, the desired shift in the optical resonant frequency of the ring resonator is determined (step 810). The change in the optical resonant frequency may be comparatively large in some circumstances. For example, changing a ring resonator frequency from one carrier band to another may be a comparatively large change in the resonant frequency. Conversely if it is desirable to correct the drift of a ring resonator frequency away from the centerline frequency of a given carrier band, the desired shift may be relatively small.

The voltage which is to be applied across the electrodes to produce the desired shift in the resonant frequency of the resonator is then calculated (step 820). This calculation may involve accounting for individual differences between ring resonators including calibration constants. The applied voltage may vary depending on the desired shift in the optical resonant frequency, the geometry of the electrodes and piezoelectric material, the mechanical coupling between the piezoelectric material and the core if they are separate, the uniformity of the electrical field produced by the electrodes through the piezoelectric material, and other factors.

The calculated voltage is then applied across the electrodes such that the piezoelectric material creates mechanical stress or strain within the light transmitting member (step 830). According to at least one exemplary embodiment, the light transmitting member itself is the piezoelectric material. The voltage may be applied in a variety of methods including sourcing the voltage from a variable voltage supply.

Following the application of the calculated voltage, the optical resonant frequency of the ring resonators is again measured to see if the desired resonant frequency was attained by the application of the voltage (step 840). Further adjustments can be made as needed by repeating steps 800 through 840 (step 850). In some applications, this method may be performed many times per second to modulate data into the optical beam being transmitted from source to receiver.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. An optical resonator configured to be tuned using piezoelectric actuation, comprising:
   a piezoelectric annular core, said core being configured to transmit light;
   a first electrode and a second electrode;
   a piezoelectric layer disposed over said core such that said piezoelectric layer surrounds said core on three sides;
   wherein said core is interposed between said first electrode and said second electrode, and wherein creating a voltage difference across said first and said second electrodes alters a geometric dimension of said core and a geometric dimension of said piezoelectric layer such that a resonant optical frequency of said resonator is changed.

2. The resonator of claim 1, wherein said first electrode and said second electrode are separated from said core by interposing a first dielectric layer between said first electrode and said core and interposing a second dielectric layer between said second electrode and said core.

3. The resonator of claim 2, wherein at least one of said first layer and said second layer are comprised of a high-κ dielectric material.

4. The resonator of claim 3, wherein said high-κ dielectric material is one of: hafnium oxide or zirconium oxide.

5. The resonator of claim 1, wherein said second electrode comprises a conductive layer abutting said core, said second electrode being configured to act as a modulator of carriers within said core and to act in conjunction with said first electrode to create a voltage potential through said core such that a dimension of said core is altered via a piezoelectric effect.

6. The resonator of claim 1, further comprising a third electrode abutting said core, said third electrode being configured to modulate carriers within said core.

7. The resonator of claim 6, further comprising a fourth electrode abutting said core, said fourth electrode being configured to act in concert with said third electrode to modulate carriers within said core.

8. The resonator of claim 6, in which said core comprises a radial protrusion extending outward from a main portion of said core, said third electrode abutting said radial protrusion such that interactions between optical modes in said core and said third electrode are reduced.

9. The resonator of claim 8, in which said fourth electrode abuts a second radial protrusion extending outward from said main portion of said core.

10. A ring resonator configured to be tuned by an application of mechanical stress comprising:
    a core, said core comprising an annular shape, said core being optically coupled to a tangential waveguide;
    a piezoelectric layer disposed over said core such that said piezoelectric layer surrounds said core on three sides;
    a first electrode and a second electrode; said piezoelectric layer being interposed between said first electrode and said second electrode;
    a first insulating layer interposed between said first electrode and said core;
    wherein said first insulating layer and said first electrode border said piezoelectric layer and surround said core on three sides;
    wherein creating a voltage bias across said first and said second electrodes actuates said piezoelectric material to create mechanical stress in said core such that an optical resonant frequency of said ring resonator is changed.

11. The ring resonator of claim 10, wherein said core itself comprises a piezoelectric material.

12. The ring resonator of claim 10, further comprising a second insulating layer interposed between said piezoelectric layer and said core.

13. The ring resonator of claim 12, in which at least one of said first insulating layer and said second insulating layer comprises a high-κ dielectric material.

14. The ring resonator of claim 13, in which said high-κ dielectric material is one of: hafnium oxide or zirconium oxide.

15. The ring resonator of claim 10, further comprising a third electrode abutting a protrusion of said core such that interaction between optical modes in said core and said third electrode is reduced.

16. The ring of claim 15, further comprising a fourth electrode abutting a separate and opposing protrusion of said core.

17. The ring resonator of claim 10, wherein said second electrode comprises a conductive layer abutting said core, said second electrode being configured to act as a modulator of carriers within said core and to act in conjunction with said first electrode to create a voltage potential through said piezoelectric layer.

18. The ring resonator of claim 10, in which both said piezoelectric layer and said core are piezo active materials which are activated by said voltage bias between said first electrode and said second electrode.

\* \* \* \* \*

UNITED STATES PATENT AND TRADEMARK OFFICE
CERTIFICATE OF CORRECTION

| | |
|---|---|
| PATENT NO. | : 8,983,238 B2 |
| APPLICATION NO. | : 12/260016 |
| DATED | : March 17, 2015 |
| INVENTOR(S) | : Bratkovski et al. |

Page 1 of 1

It is certified that error appears in the above-identified patent and that said Letters Patent is hereby corrected as shown below:

In the claims

Column 10, line 65, Claim 16, delete "ring" and insert -- ring resonator --, therefor.

Signed and Sealed this
Third Day of November, 2015

Michelle K. Lee
*Director of the United States Patent and Trademark Office*